United States Patent [19]

Bateman

[11] Patent Number: 5,059,964
[45] Date of Patent: * Oct. 22, 1991

[54] PREDICTIVE WINDSHEAR WARNING INSTRUMENT

[75] Inventor: Charles D. Bateman, Bellevue, Wash.

[73] Assignee: Sundstrand Data Control, Inc., Redmond, Wash.

[ * ] Notice: The portion of the term of this patent subsequent to Feb. 27, 2007 has been disclaimed.

[21] Appl. No.: 444,513

[22] Filed: Dec. 1, 1989

Related U.S. Application Data

[63] Continuation of Ser. No. 34,807, Apr. 3, 1987, Pat. No. 4,905,000.

[51] Int. Cl.$^5$ .............................................. G08B 23/00
[52] U.S. Cl. ................................... 340/968; 244/181; 340/963; 364/434
[58] Field of Search ....................... 340/968, 963, 962; 364/434; 73/178 R, 178 T; 244/181, 182; 374/112

[56] References Cited

U.S. PATENT DOCUMENTS

| | | | |
|---|---|---|---|
| 3,427,581 | 2/1969 | Hartman | 340/968 |
| 3,935,460 | 1/1976 | Flint | 374/112 |
| 4,725,811 | 2/1988 | Muller et al. | 340/963 |
| 4,905,000 | 2/1990 | Bateman | 340/968 |
| 4,947,165 | 8/1990 | Zweifel | 340/968 |
| 4,965,572 | 10/1990 | Adamson | 340/968 |

OTHER PUBLICATIONS

"The Crash of Delta Flight 191", NOAA Technical Report ERL-430-ESG, Caracena et al., Dec. 1986, pp. 20, 24.

Primary Examiner—Donnie L. Crosland
Assistant Examiner—Brent A. Swarthout
Attorney, Agent, or Firm—Mason, Kolehmainen, Rathburn & Wyss

[57] ABSTRACT

An instrument (10) is disclosed for an aircraft having a windshear warning system to vary the threshold alarm setting as a function of a thermodynamic property of the air and as a function of local geographic and seasonal conditions. Specifically, a function generator 16 and other circuitry is disclosed. The output from the function generator 16 and other circuitry is then added to a fixed threshold acceleraton signal to produce a threshold alarm signal which has a value that is a function of the temperature of the air, in a basic embodiment.

4 Claims, 2 Drawing Sheets

DL-191 DATA

RATE OF CHANGE OF TEMPERATURE (DEG C/SEC)

VERTICAL WIND (KT)

AIRCRAFT ALTITUDE (FT)

STATIC AIR TEMPERATURE (DEG C)

PREDICTIVE WINDSHEAR WARNING INSTRUMENT

This is a continuation of application Ser. No. 07/034,807, filed Apr. 3, 1987, now U.S. Pat. No. 4,905,000.

TECHNICAL FIELD

This invention is related to the subject of aircraft instruments, in general, and to the subject of windshear warning systems, in particular.

BACKGROUND OF THE INVENTION

Those skilled in the art are familiar with the principles of windshear and windshear warning systems. For example, there are U.S. Pat. Nos. 3,892,374; 4,053,883 and 4,593,285. These systems are basically "reactive" systems because they cannot sense conditions ahead of the flight path of the aircraft; in that sense, these systems are not predictive or anticipatory of a dangerous windshear condition. They utilize sensors aboard the aircraft to compute air mass acceleration and inertial acceleration, in order to provide a warning of a dangerous windshear condition. Because they are "reactive", they provide a warning only after the aircraft has entered a dangerous downdraft or microburst situation. Thus, these prior art systems provide a short time for the pilot to safely maneuver the aircraft.

Heretofore, warning threshold of a windshear warning system has been established or set as a function of the climb performance of the aircraft. For example, in the case of the Boeing 737 aircraft, the warning threshold is set at approximately 150 mgs (i.e., 1000 mgs = 32 ft/sec$^2$); the Boeing 747 aircraft has a setting of approximately 80 mgs (both vertical and horizontal windshear or components thereof). Such threshold settings are basically a compromise between giving a reasonable and timely alert and avoiding nuisance warnings due to mild gusts or slightly turbulent conditions, such as ground turbulence, which may be encountered during a normal take-off and landing. Preferably, a windshear warning system should distinguish between a deadly convective flow (such as a "microburst") and a Fall, windy day when a cold front has recently passed through the area. More importantly, a windshear warning system should anticipate a dangerous condition, rather than simply become responsive to it. A windshear warning system that would not only provide adequate warning but also take in consideration special conditions at the airport of interest, including seasonal and geographic conditions would prove to be a significant contribution to the art and an important advance in flight safety.

SUMMARY OF THE INVENTION

This invention is an improvement over conventional windshear warning systems inasmuch as it incorporates a better understanding of the meteorological phenomena associated with a windshear or microburst condition, thereby improving the margin against unwanted warnings and improving the time for the pilot to react.

In accordance with the present invention, a method and apparatus is disclosed for providing a warning to the pilot of an aircraft of a dangerous windshear condition. Specifically, a thermodynamic property of the air is sensed (i.e., pressure, temperature, etc.), and a signal whose value is a function of that thermodynamic property, is generated and added to a fixed threshold signal to produce a variable threshold signal, the value of which is a function of that thermodynamic property. The variable threshold signal is then used as a basis of comparison against a windshear signal and, in the event that the threshold value is exceeded, an alarm is generated.

In one embodiment, a static air temperature, or the ambient temperature surrounding the aircraft, is used to vary the threshold warning setting for a windshear condition. In another embodiment, the combination of temperature and temperature rate is used to vary the threshold warning condition and thereby improve the signal to noise ratio for detecting a microburst or a windshear associated with frontal passage, thereby discriminating against strong gusts that pose no danger to the aircraft. In still another embodiment, local geographic and seasonal conditions are used to vary the threshold setting.

Many other features and advantages of the invention will become apparent from a discussion which follows.

DETAILED DESCRIPTION OF THE INVENTION

While this invention may be practiced in many different forms, there will be shown the drawings and will herein be described in detail several specific embodiments of the invention. It should be understood, however, that the present disclosure is to be considered an exemplification of the principles of the invention and is not intended to limit the invention to the specific embodiments described.

I have studied data available in accident reports and of flight recorders on aircraft that have been in accidents attributable to windshear (see FIGS. 5A through 5D). I have concluded that all accidents, attributable to a dangerous microburst, have been associated with a static temperature between 20 degrees Centigrade and 40 degrees Centigrade. More particularly, the majority have usually been associated with decreasing temperatures, such as that associated with evaporative or cooling air flow (i.e., this is not however always the case as some observations have been made of warm air flow from the surrounding air descending apparently by momentum). Thus, static air temperature (FIG. 5D) and a decreasing temperature rate (FIG. 5A) should be used to vary the threshold warning condition of a windshear warning system.

I have also found that, in some situations, if the air temperature is less than 20 degrees Centigrade, the gain of or the effect of the negative or decreasing rate of temperature should be reduced. This is an important observation in that this may be used to reduce the liklihood of nuisance warnings. Such would be the result when the aircraft is descending into a temperature inversion (i.e., Los Angles or San Francisco in the Summertime, or Fairbanks, Ak. in the Wintertime, or those airports situated in a valley surrounded by mountains, such as Zurich, Switzerland). Thus, the warning time, or the time to alert the pilot before dangerous convective windshear is encountered, can be improved by decreasing the threshold setting by the negative temperature rate, and temperatures in excess of 20 degrees Centigrade. For example, using the atmospheric information available for the well known Dallas-Ft. Worth L-1011 accident, at least a few seconds of extra warning could have been given the pilot of the aircraft had that aircraft been equipped with a conventional warning system, and the threshold setting means, that is the subject of the present invention.

Figure 1:
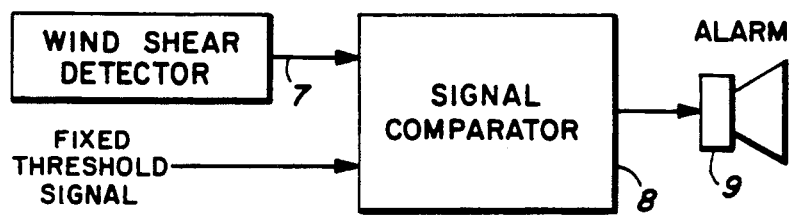
FIG. 1 is an illustration of a basic windshear warning system.

Turning now to the drawings, FIG. 1 is a block diagram of an elementary windshear warning system. Basically, a signal 7 is generated by a windshear detector that is reprsentative of a windshear condition. That signal 7 is compared against a fixed threshold signal in a signal comparator 8. In the event that the threshold setting is exceeded, an alarm 9, preferably a voice synthesized alarm, is sounded.

Figure 2:
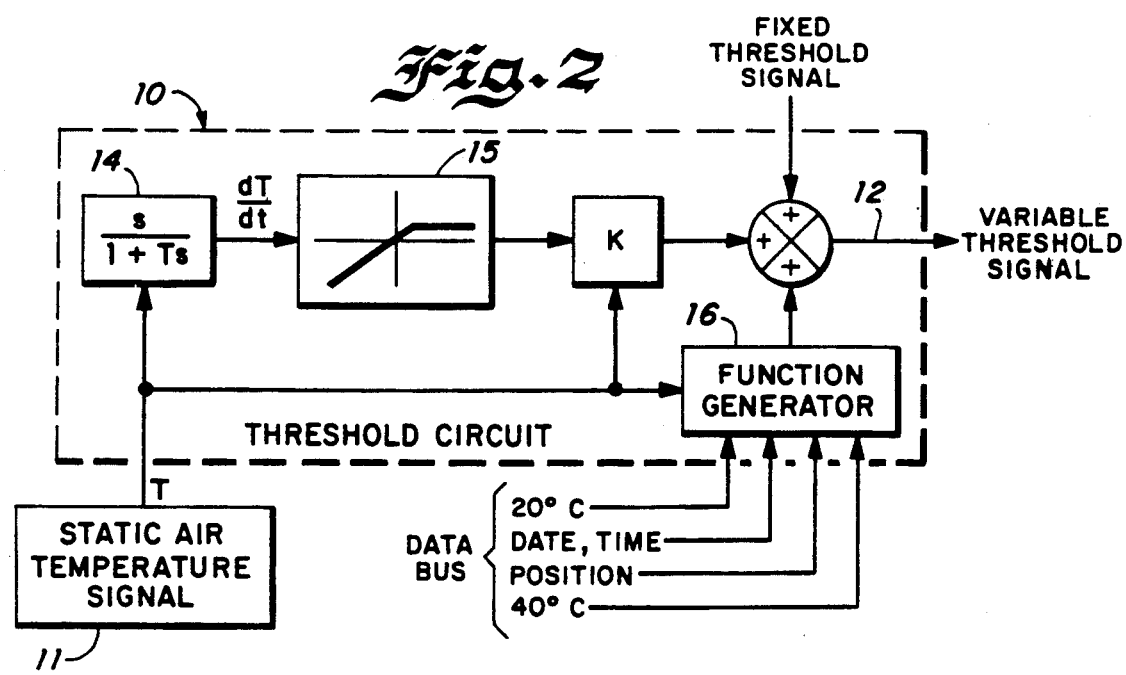
FIG. 2 is a block diagram of the circuit that is the subject of the present invention.

In FIG. 2, a block diagram is presented that describes my invention. Basically, a threshold circuit 10 is used to produce a variable signal against which the windshear signal 7 is compared and which is a function of a thermodynamic property of the air. Specifically, FIG. 2 illustrates an embodiment wherein a static air temperature signal 11 is used to generate a variable threshold signal 12. The static air temperature signal "T" is a signal which is readily available on most commercial and larger single engine aircraft. This signal is a mandatory input for most aircraft so that the pilot can monitor for icing conditions, calculate ground speed, calculate maximum engine pressure ratio (EPR), etc. Other means exist for predicting or measuring the temperature of the air in advance of the flight path of the aircraft. See, for example, U.S. Pat. No. 4,342,919 where infrared radiation is used or U.S. Pat. No. 3,856,402 where laser's are used to detect clear air turbulence in advance of the flight path of the aircraft. That temperature signal T is then sent to a filter 14 which differentiates the signal and selects only the long-term components of the temperature signal. I have found that when the air temperature is less than 20 degrees Centigrade, the effect of a decreasing rate of temperature should be reduced insofar as the effect of that negative temperature rate on the threshold setting of a windshear warning system is concerned. Therefore, the temperature rate signal is sent to a limiter or variable gain circuit 15. The limiter 15 has a signal output which is dependent on the rate of change of temperature. The output from that circuit 15 may be scaled and added to a fixed threshold signal to produce a variable threshold signal 12. The result is a signal which varies as a function of the rate of change of the static air temperature.

A further enhancement results by using the static air temperature signal as the input to a function generator 16. That generator produces an output signal which can be a simple linear function of temperature or a more complex function of T (i.e., temperature squared, etc.). The output of the function generator 16, when scaled and added to the fixed threshold signal and the signal which is a function of the rate of change of temperature, is a variable threshold signal which is a more complicated function of static air temperature. This more complicated function should be useful in reducing nuisance alarms.

Since the weather surrounding an airport is dependent on the local geography and the season of the year, there are certain airports where windshear and strong gusts are more likely than at other airports. Thus, the threshold signal should, to be less likely a source of nuisance warnings, be a function of geographic position, the time of day, the season of the year, and other peculiarities of the airport. This I have shown as inputs to the function generator 16. Reference should be made to my U.S. Pat. No. 4,567,483 wherein a Ground Proximity Warning System is disclosed where warning thresholds are dependent, in part, on the particular airport that is being used. Such a system would tailor the warnings to the airport then being used by the pilot and would even prove to be more reliable than the reactive windshear warning systems of the prior art.

Figure 3:
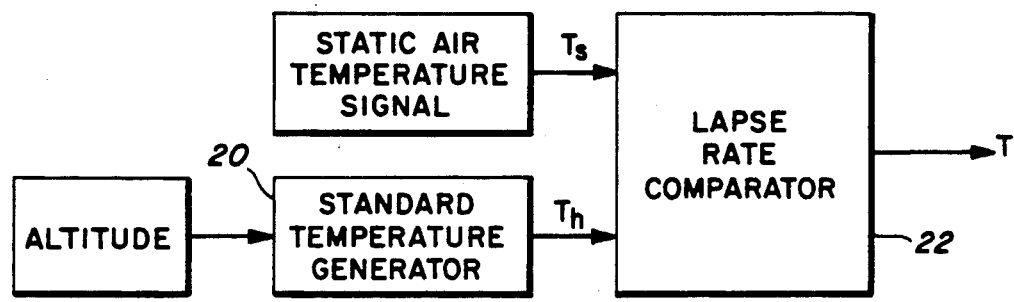
FIG. 3 is a block diagram of a circuit which can be used to correct a static air temperature signal for the atmospheric lapse rate.

Turning now to FIG. 3, those skilled in the art, including licensed pilots, are familiar with the fact that the temperature of a standard atmosphere changes as a function of altitude and, in particular, decreases as the altitude increases. This is commonly referred to as the "lapse rate" (approximately 2.2° C. per 1000 feet). FIG. 3 provides a further refinement of the apparatus shown in FIG. 2 in that the static air temperature signal is corrected for those temperature changes due to an increase in altitude. Specifically, a temperature signal $T_h$ is produced from a circuit 20 as a function of the altitude of the aircraft. Another circuit 22 compares the temperature signal $T_h$ which is a function of altitude against the static air temperature signal $T_S$. The output T is a signal which has been corrected for those changes in temperature due to the lapse rate.

Figure 4:
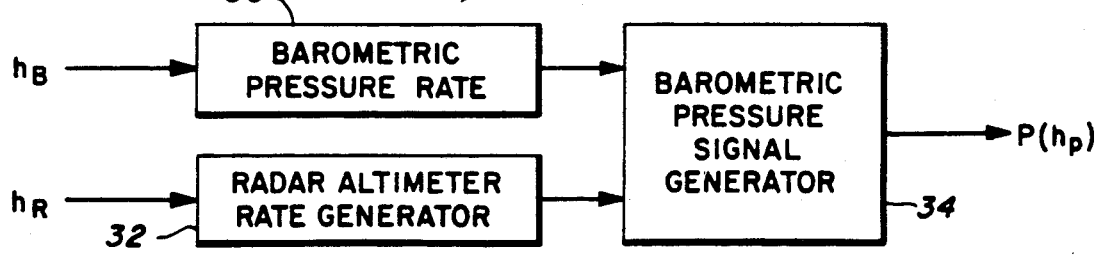
FIG. 4 is a block diagram of the circuit used to develop a barometric pressure signal which may be used to vary the windshear threshold warning signal.
Figure 5A:
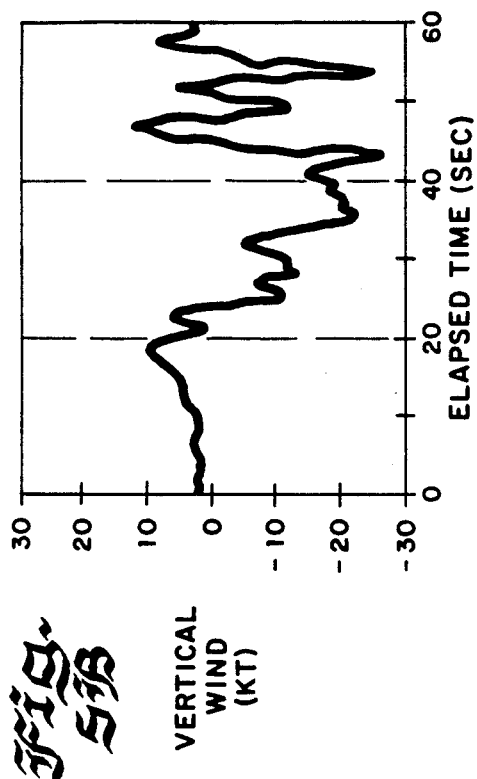
FIGS. 5A through 5D are graphs showing the relationship of temperature in vertical wind of an aircraft encountering a dangerous windshear condition.
Figure 5B:
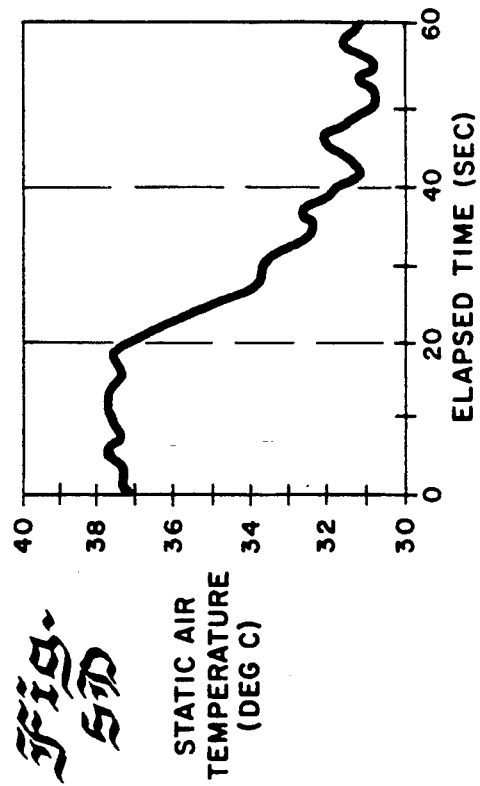
Figure 5C:
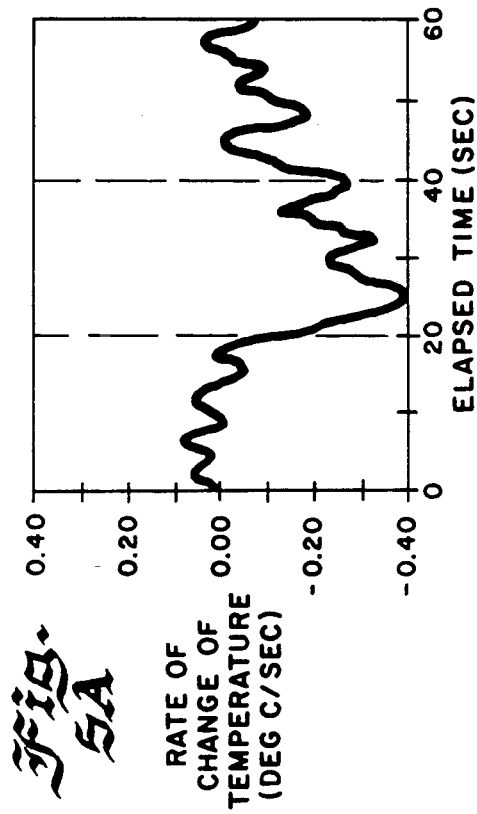
Figure 5D:
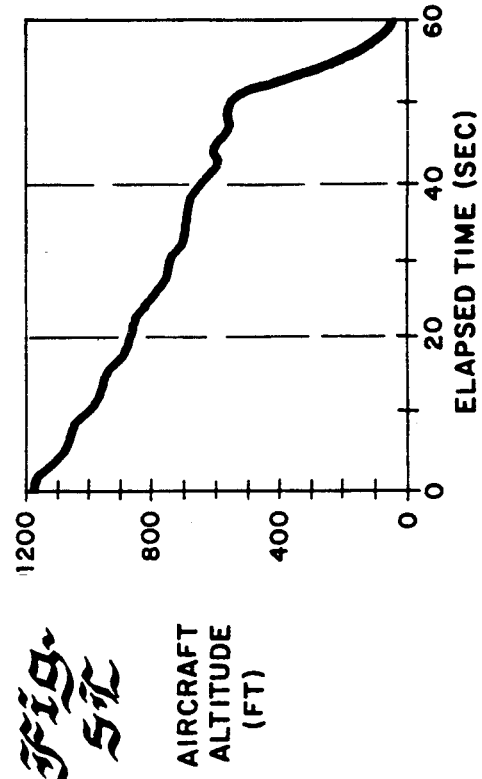

Thunderstorms begin with a cumulus cloud which swells and grows vertically at a rapid rate. In the beginning, moist air is drawn upwardly and cloud droplets grow into super-cooled raindrops as they are swept up beyond the freezing level. As the raindrops grow too large to be supported by the updraught, they fall, dragging the air along and producing a strong downdraught. Dryer outside air is then entrained and cooled as the raindrops evaporate, stengthening the downdraught and generating strong winds and heavy surface precipitation. Stong low-level windshear often occurs in the area of separation between the inflow and outflow of air, also known as the "gust front". The gust front may extend for 18 to 28 kilometers in front of the area of precipitation. The most dangerous form of windshear, the microburst, is an intense downdraught which, upon striking the ground, spreads out into a circular vortex, radiating in all directions. Its unique shape has been described, colloquially, as "an up-side down daisy". I believe that fingers of air radiate from the ground as a result of such a microburst and that these fingers can be sensed and thereby provide an advance warning of the possibility of a microburst or dangerous windshear situation. In particular, the rate of change of barometric pressure as well as temperature may provide an advance warning by modifying the threshold signal which is used to generate an alarm. Since the barometric pressure also decreases as a function of altitude (i.e. 1 inch Hg per 1000 feet), this thermodynamic property, if used to vary the threshold signal, must be corrected for those changes in barometric pressure due to a change in altitude. In FIG. 4, a block diagram is presented for such a circuit. Basically, a signal which is a function of the rate of change of barometric pressure is compared against a signal which is a function of the rate of change of altitude. Any change in barometric pressure not due to a change of altitude must be attributed to a change in the atmospheric conditions surrounding the aircraft. Specifically, a barometric pressure rate generator 30 provides a signal which is a function of the rate of change of barometric pressure. A rate generator 32 provides a signal (i.e., from an inertial navigation unit or inertial reference system or a radar altimeter) which is a function of the rate of change of the altitude of the aircraft above the ground (or inertial vertical speed or absolute altitude over level ground or water). These two signals are fed to a barometric signal generator 34 which produces a signal p which is a function of the barometric pressure ($h_p$) at the altitude of the aircraft. This signal can then be used in a circuit similar to the threshold circuit 10 of FIG. 2 to vary the threshold warning signal.

It should be understood that no limitation with respect to the specific apparatus illustrated herein is intended or should be inferred. It is, of course, intended to cover, by the appendent claims, all such modifications as fall within the scope of the claims.

I claim:

1. In an aircraft having means for providing a signal representative of a windshear condition, means for providing a signal representative of the altitude of the aircraft, means for providing a static air temperature signal representative of the temperature of the air through which the aircraft is flying and means for providing a warning in the event that the signal representative of a windshear condition exceeds a threshold signal, the improvement comprising:

means responsive to the altitude representative signal for providing a standard temperature representative signal that is determined by the altitude of the aircraft;

threshold setting means for comparing the temperature signal and the standard temperature representative signal and decreasing the value of the threshold signal when the static air temperature representative signal decreases at a greater rate than the standard temperature representative signal, wherein said threshold setting means includes means for lowering the value of the threshold signal for a predetermined geographic position of the aircraft which indicates a windshear condition is probable.

2. A wind shear warning system for aircraft comprising:

means for detecting a wind shear and for generating a warning if the wind shear exceeds a predetermined magnitude;

means for determining rate of change of the barometric pressure rate of the air around the aircraft;

means for non-barometrically determining the rate of change of altitude of the aircraft;

means responsive to said barometric pressure rate determining means and to said rate of change of altitude determining means for comparing the rate of change of the barometric pressure with the rate of change of altitude and generating a representation of the difference therebetween; and means responsive to said difference representation for altering the predetermined magnitude at which the warning is generated if the rate of change of barometric pressure deviates from the rate of change of the altitude.

3. A wind shear warning system for aircraft, comprising:

means for detecting a wind shear and for generating a warning if the wind shear exceeds a predetermined magnitude;

means for determining the static air temperature of the air around the aircraft;

means responsive to said temperature determining means for determining the rate of change of the static air temperature; and means responsive to the rate of change of temperature for altering the predetermined magnitude in response to the rate of change of air temperature, wherein said altering means is responsive to the air temperature for altering the predetermined magnitude in response to the static air temperature, wherein said predetermined magnitude is reduced at static air temperatures above a predetermined air temperature.

4. In an aircraft having means for providing a signal representative of a windshear condition, means for providing a signal representative of the altitude of the aircraft, means for providing a static air temperature signal representative of the temperature of the air through which the aircraft is flying and means for providing a warning in the event that the signal representative of a windshear condition exceeds a threshold signal, the improvement comprising:

means responsive to the altitude representative signal for providing a standard temperature representative signal that is determined by the altitude of the aircraft;

threshold setting means for comparing the temperature signal and the standard temperature representative signal and decreasing the value of the threshold signal when the static air temperature representative signal decreases at a greater rate than the standard temperature representative signal, wherein said predetermined magnitude is altered as a function of time of day and geographic position of the aircraft.

* * * * *